UNITED STATES PATENT OFFICE.

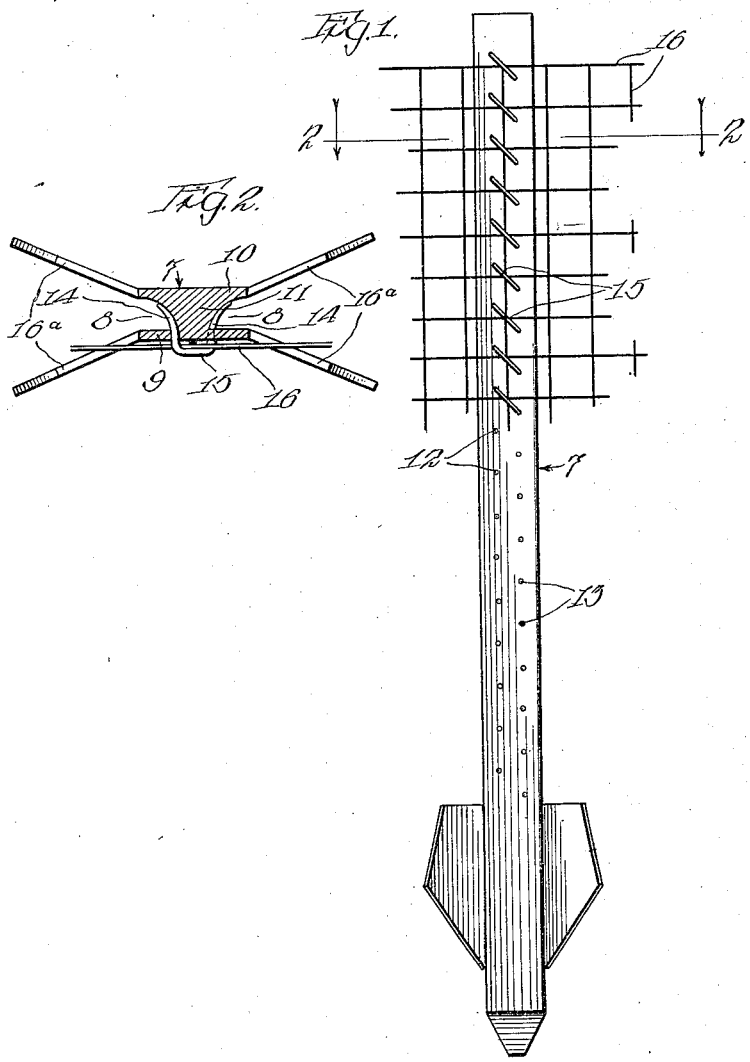

HOWARD D. SALINS, OF CHICAGO, ILLINOIS.

FENCE-POST.

1,170,194. Specification of Letters Patent. Patented Feb. 1, 1916.

Application filed August 5, 1915. Serial No. 43,709.

*To all whom it may concern:*

Be it known that I, HOWARD D. SALINS, a citizen of the United States, and resident of Chicago, in the county of Cook and State of Illinois, have invented certain new and useful Improvements in Fence-Posts, of which the following is a specification.

This invention relates to the type of fence posts used in the construction and support of wire fences, and it consists in certain peculiarities of the construction, novel arrangement and operation of the various parts thereof, as will be hereinafter more fully set forth and specifically claimed.

The principal object of the invention is to provide a fence post of the above named general character, which shall be simple and inexpensive in construction, strong, durable and efficient in use or operation, and so made that the wire constituting the body of the fence, whether in the form of strands, or in the form of netting or fabric, can be quickly and easily fastened to the post in a very secure and permanent manner.

Other objects and advantages of the invention will be disclosed in the subjoined description and explanation.

In the accompanying drawing which serves to illustrate an embodiment of the invention—Figure 1 is a front face view of a fence post embodying one form of the invention, showing a portion of the fence body in the form of wire netting, mounted on and secured to the post, and Fig. 2 is a plan sectional view taken on line 2—2 of Fig. 1, looking in the direction indicated by the arrows.

Like numerals of reference refer to like parts throughout the different views of the drawing.

The reference numeral 7, designates the post proper, which post may be made of any suitable size and material, but by preference, of metal, and as shown in Fig. 2 of the drawing, has on each of its sides a longitudinal or vertical channel 8, which may extend from one end of the post to its other end, thus providing it with front and rear members or portions 9 and 10, respectively, which members or portions are united by an interposed part or body, 11, which is preferably co-extensive in length with said members. The front portion of the body of the post, or interposed part 11, or that portion thereof adjacent to the member 9, is narrower in cross-section than its rear portion, or that part thereof adjacent to the member 10, as is clearly shown in Fig. 2, of the drawing, and said part 11, has each of its sides rearwardly and outwardly inclined from its juncture with the member 9, or front of the post, for the purpose to be presently explained. The member 9 is provided with a series of openings 12 and 13, located in longitudinal rows with respect to the post, the openings 12, being disposed along one side of the body 11, while the openings 13, are located along the other side thereof. These openings are preferably arranged at different heights alternately at the sides of the body of the post, and extend entirely through the member 9, and are for the reception of the prongs or arms 14, of the staples 15, which are employed to fasten or secure the fence body 16, to the post along the front face of the same.

In Fig. 1, of the drawing, the fence body is shown as consisting of wire netting or meshed-wire-fabric, and the staples 15, as being located diagonally with respect to the post, with one prong of each located in one of the openings 12, and the other prong of each located in one of the openings 13, and as striding the fabric or fence body at the juncture of its horizontal strands with one of its vertical strands or wires, and while this is the preferred way of arranging the various parts, especially when wire netting or fabric is used as a fence-body, yet I do not desire to be understood as limiting myself to the aforesaid arrangement, as it is obvious that the staples can be located in the openings of either row, or alternately in the openings of either row, and straddle the horizontal strands only. It is further evident, that if it is desired to use a fence body composed of horizontal strands only, the same or similar application of the staples can be employed. It is, however, an important feature of my invention to provide the sides of the body 11, or interposed part, with sides sloping outwardly and rearwardly, or rearwardly diverging sides, so that when the prongs 14, of the staples 15, are extended through the openings 12 and 13, and forced rearwardly, said prongs will be automatically deflected, or virtually clenched, and will firmly hold the fence-body in position on the post.

Having thus fully described the invention, what I claim as new and desire to secure by Letters Patent is—

A post provided with a facing member having openings extended therethrough, said openings being arranged in pairs, each pair located in a diagonal line with respect to the post and one opening of each of said pairs being located on one side of a vertical line drawn through the middle portion of said facing member, and a body portion connected to the rear surface of said facing member between the vertical rows of said openings and having its sides divergently and rearwardly extended from said facing member, the rear portion of said body portion being of substantially the same width as the facing member.

HOWARD D. SALINS.

Witnesses:
MAX BRUSKI,
CHAS. C. TILLMAN.

Copies of this patent may be obtained for five cents each, by addressing the "Commissioner of Patents, Washington, D. C."